United States Patent
Kim et al.

(10) Patent No.: US 12,512,775 B2
(45) Date of Patent: Dec. 30, 2025

(54) MOTOR DRIVING APPARATUS AND CONTROL METHOD THEREFOR

(71) Applicants: HYUNDAI MOTOR COMPANY, Seoul (KR); KIA CORPORATION, Seoul (KR)

(72) Inventors: Sung Do Kim, Seoul (KR); Joo Yeon Kim, Seoul (KR); Min Su Kang, Paju-si (KR); Chang Seok You, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 105 days.

(21) Appl. No.: 18/369,405

(22) Filed: Sep. 18, 2023

(65) Prior Publication Data

US 2024/0313682 A1    Sep. 19, 2024

(51) Int. Cl.
  *H02P 21/26* (2016.01)
  *H02P 21/18* (2016.01)
  *H02P 21/22* (2016.01)
  *H02P 27/08* (2006.01)

(52) U.S. Cl.
  CPC .............. *H02P 21/26* (2016.02); *H02P 21/18* (2016.02); *H02P 21/22* (2016.02); *H02P 27/085* (2013.01)

(58) Field of Classification Search
  CPC .......... H02P 21/26; H02P 21/18; H02P 21/22; H02P 27/085; H02P 6/183; H02P 6/28; H02P 27/08; B60L 3/003; B60L 15/02
  USPC .............. 318/400.02, 400.01, 700
  See application file for complete search history.

(56) References Cited

U.S. PATENT DOCUMENTS

| | | | |
|---|---|---|---|
| 6,388,416 B1 * | 5/2002 | Nakatani | H02P 6/20 318/722 |
| 8,674,638 B2 * | 3/2014 | Balazovic | H02P 21/18 318/400.33 |
| 9,998,059 B2 * | 6/2018 | Lee | H02P 21/22 |
| 10,879,751 B2 * | 12/2020 | Takahashi | H02P 27/08 |

FOREIGN PATENT DOCUMENTS

| | | |
|---|---|---|
| JP | 2015-065729 A | 4/2015 |
| JP | 5858058 B2 | 2/2016 |
| JP | 2018-125976 A | 8/2018 |
| JP | 6467259 B2 | 2/2019 |
| JP | 2021-184672 A | 12/2021 |
| KR | 10-2236689 B1 | 4/2021 |

* cited by examiner

*Primary Examiner* — David Luo
(74) *Attorney, Agent, or Firm* — MCDONNELL BOEHNEN HULBERT & BERGHOFF LLP

(57) ABSTRACT

A motor driving apparatus includes a motor an inverter driving the motor based on a switching signal, and a controller. The controller determines a current position estimated value of the motor by applying a zero-voltage vector pulse to the switching signal when entering the driving control of the motor, determines whether the motor is in a stop state according to an amount of change in the current position estimated value, and performs a pulse width modulation control by adjusting a duty ratio of the switching signal when the motor is determined to be in the stop state.

15 Claims, 5 Drawing Sheets

MOTOR DRIVING APPARATUS AND CONTROL METHOD THEREFOR

CROSS REFERENCE TO RELATED APPLICATIONS

The present application claims priority to Korean Patent Application No. 10-2023-0033428, filed on Mar. 14, 2023, the entire contents of which is incorporated herein for all purposes by this reference.

TECHNICAL FIELD

The present disclosure relates to a motor driving apparatus and a control method thereof capable of driving a sensorless motor.

BACKGROUND

A motor driving apparatus is used in an air compressor of a fuel cell electric vehicle (FCEV) and the like, which drives a motor having a rotor that rotates and a stator in which a coil is wound. The motor driving apparatus generally determines a position of the rotor using a hall sensor, such as a position sensor, however, when the position sensor is removed, the motor may be driven through a sensorless control method, which determines the position of the rotor by estimating the back electromotive force of the motor.

Meanwhile, the motor may be in the inertial braking state where the rotational inertia is reduced, and in the inertial braking state, the back electromotive force (EMF) of the motor may not be generated. Upon the back EMF of the motor is estimated in the inertial braking state of the motor, determining of the current position of the motor rotor may not be possible. For example, when the air compressor controller of the FCEV is reset due to an abnormal operation, and the air compressor of the motor is in the inertial braking state, the air compressor controller may not determine the current position of the rotor of motor through the back EMF, and thus the motor may not be driven assuming that the motor is in a stop state.

When the motor is in inertial braking, but the air compressor controller drives the motor assuming the motor is stationary, there may be an overcurrent of the motor as the current control is performed in the incorrectly determined rotor position. Here, in order to prevent the overcurrent of the motor, the standby time for motor driving may be set from the time when the air compressor controller is reset to the time when the motor is expected to stop, but this method may cause unnecessary delay in driving the motor.

Matters described as the related art are provided merely for promoting understanding for the background of the disclosure, and should not be taken as the prior art already known to a person having ordinary knowledge in the art.

SUMMARY

Therefore, the present disclosure has been made in view of the above problems, and it is a technical object of the present disclosure to mitigate the overcurrent of a motor and unnecessary delay of the motor driving by determining the amount of change in the current position estimated value of the motor by applying the zero-voltage vector pulse to an inverter when a controller of a motor driving apparatus is reset after entering driving control of the motor, and performing a pulse width modulation to drive the motor according to the determined result.

The technical objects to attain in the present disclosure are not limited to the above-described technical objects and other technical objects which are not described herein will become apparent to those skilled in the art from the following description.

To accomplish the above object, according to one aspect of the present disclosure, there is provided a motor driving apparatus including a motor, an inverter driving the motor based on a switching signal, and a controller determining a current position estimated value of the motor by applying a zero-voltage vector pulse to the switching signal when entering the driving control of the motor, determining whether the motor is in a stop state according to an amount of change in the current position estimated value, and performing a pulse width modulation control by adjusting a duty ratio of the switching signal when determined as the motor is in the stop state.

In one example, the controller may apply the zero-voltage vector pulse to the switching signal in the predetermined time interval when entering the driving control of motor, and the current position estimated value may be determined based on the result of the current of the motor when the zero-voltage vector pulse is applied.

In one example, the controller may determine that the motor is in the stop state when the amount of change in the current position estimated value does not fall within a predetermined position change amount range.

In one example, the controller may redetermine whether the motor is in the stop state according to the amount of change in a current speed estimated value of the motor when the amount of change in the current position estimated value falls within the predetermined position change amount range.

In one example, the controller may determine that the motor is in the stop state when the amount of change in the current speed estimated value does not fall within the predetermined speed change amount range.

In one example, the controller may determine that the motor is in an inertial braking state when the amount of change in the current speed estimated value falls within the predetermined speed change amount range, and determine the current position estimated value by applying the zero-voltage vector pulse to the switching signal until the motor is determined to be in the stop state.

In one example, the controller may determine the current position estimated value based on a result of a current sensing of the motor, at a first time point at which the zero-voltage vector pulse is applied to the switching signal, the current position estimated value based on a result of a current sensing of the motor, at a second time point at which the zero-voltage vector pulse is applied to the switching signal, and the current speed estimated value, based on the current position estimated value of the first time point, the current position estimated value of the second time point, and a predetermined time interval between the first time point and the second time point.

In one example, the controller determines that the motor is in the stop state when a predetermined standby time is elapsed at the time point at which the motor enters the driving control of the motor when the number of times that the changes of the current position estimated value corresponding to '0' reaches a predetermined number of times.

In addition, to accomplish the above objects, according to one aspect of the present disclosure, there is provided a control method for a motor driving apparatus includes: determining a current position estimated value of a motor by applying a zero-voltage vector pulse to a switching signal that is input to an inverter that drives the motor when entering the driving control of the motor; determining whether the motor is in a stop state according to an amount of change in the current position estimated value; and performing a pulse width modulation control by adjusting a duty ratio of the switching signal when determined as the stop state.

In one example, the determining the current position estimated value may include: applying the zero-voltage vector pulse to the switching signal in a predetermined time interval when entering the driving control of the motor; and determining the current position estimated value based on a result of a current sensing of the motor when applying the zero-voltage vector pulse.

In one example, the determining whether the motor is in the stop state may include determining that the motor is in the stop state when the amount of change in the current position estimated value does not fall within a predetermined position change amount range.

In one example, the determining whether the motor is in the stop state may include redetermining whether the motor is in the stop state according to an amount of change in a current speed estimated value when the amount of change in the current position estimated value falls within the predetermined position change amount range.

In one example, the redetermining whether the motor is in the stop state may include determining that the motor is in the stop state when the amount of change in the current speed estimated value does not fall within a predetermined speed change amount range.

In one example, the redetermining whether the motor is in the stop state may include determining that the motor is in an inertial braking state when the amount of change in the current speed estimated value falls within the predetermined speed change amount range, and the determining whether the motor is in the stop state may be redone until the motor is determined as in the stop state.

In one example, the method may further include determining that the motor is in the stop state after a predetermined standby time has elapsed from the time point at which driving control of the motor is entered when the number of times that the amount of change in the current position estimated value corresponds to '0' reaches a predetermined number of times.

According to the present disclosure, the overcurrent of a motor and unnecessary delay of motor driving may be mitigated by: determining the amount of change of a current position estimated value of a motor by applying a zero-voltage pulse to an inverter when entering driving control of the motor after a controller of a motor driving apparatus is reset; and performing a pulse width modulation control for driving the motor according to the determined result.

Advantages which may be obtained in this specification are not limited to the aforementioned advantages, and various other advantages may be evidently understood by those skilled in the art to which the present disclosure pertains from the following description.

BRIEF DESCRIPTION OF THE FIGURES

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

Hereinafter, embodiments of the present disclosure will be described in greater detail with reference to the accompanying drawings. In describing the present disclosure, for ease of understanding, the same reference numerals are used to denote the same components throughout the drawings, and repetitive description on the same components will be omitted.

In terms of describing the embodiments of the present disclosure, detailed descriptions of related art will be omitted when they may make the subject matter of the embodiments of the present disclosure rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and spirit of the present disclosure.

In the description of the following embodiments, the term "preset" means that the numerical value of a parameter is determined in advance when the parameter is used in a process or algorithm. Depending on an embodiment, the numerical value of a parameter may be set when a process or algorithm starts or may be set during a period in which the process or algorithm is executed.

Terms such as "first" and "second" may be used to describe various components, but the components should not be limited by the above terms. In addition, the above terms are used only for the purpose of distinguishing one component from another.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise.

In the present application, it will be further understood that the terms "comprises," "includes," etc. specify the presence of stated features, integers, steps, operations, elements, components, or combinations thereof, but do not preclude the presence or addition of one or more other features, integers, steps, operations, elements, components, or combinations thereof.

A controller is a communication device that communicates with other controllers or sensors to control the function that is responsible for, a memory that stores an operating system or logic commands and input and output information, and one or more processor that performs determination, calculation, decision, and the like, which is necessary for the control the function that is responsible therefor.

Figure 1:
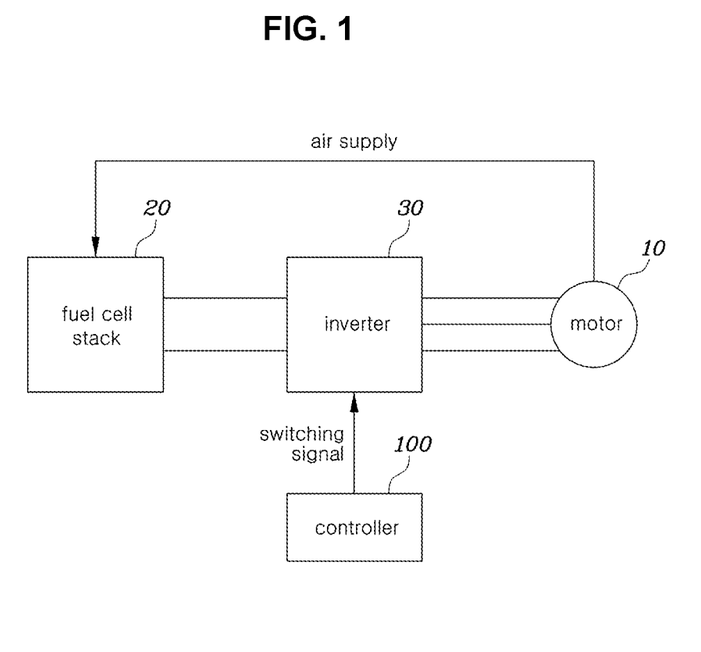
FIG. 1 is a block diagram showing a configuration of a motor driving apparatus according to an embodiment of the present disclosure.

FIG. 1 is a block diagram showing a configuration of a motor driving apparatus according to an embodiment of the present disclosure.

With reference to FIG. 1, the motor driving apparatus according to an embodiment of the present disclosure may include a motor 10 having a plurality of windings corresponding to each of a plurality of phases, a fuel cell stack 20, an inverter 30 configured to drive the motor 10 by converting the voltage of the fuel cell stack 20 to DC based on a switching signal, and a controller 100 configured to switch switching elements included in the inverter 30 by output the switching signal when a pulse width modulation (PWM) control is performed. The controller 100 may control the driving of the motor 10 by outputting the signal to switch the switching elements included in the inverter 30 based on the PWM control.

The motor 10 according to the present embodiment may be implemented as the motor of an air compressor for generating the fuel cell system. These are merely illustrative examples, and the present disclosure is not limited thereto. In addition, the motor driving apparatus may supply DC voltage to the inverter 30 via a battery instead of the fuel cell stack 20 according to an embodiment.

The controller 100 may determine a current position estimated value and a current speed estimated value of the motor 10 without a position sensor, such as a hall sensor, and may perform a sensorless control driving the motor 10 based on the determined result. In the present embodiment, the current position of the motor 10 corresponds to the current position of the rotor provided in the motor 10, and the current speed of the motor 10 may correspond to the current angular velocity of the rotor provided in the motor 10.

In general, when the PWM control is performed, the controller 100 may determine the current speed estimated value of the motor 10 by estimating the back EMF of the motor 10 based on the current control of the motor 10, and the duty ratio of the switching signal is adjusted so that the current estimated speed value follows a value of speed command for the motor 10. The value of the speed command may be input from an upper-level controller (not shown) of the controller 100.

Meanwhile, the motor 10 may be in the inertial braking state where the rotational inertia is reduced, and in the inertial braking state, the back EMF of the motor 10 may not be generated. Upon the back EMF of the motor 10 is estimated in the inertial braking state of the motor 10, determining of the current position of the motor 10 may not be possible.

For example, when the controller 100 is reset due to an abnormal operation and the motor 10 is in the inertial braking state, determining the current position of the motor 10 using the back EMF estimation method may not be possible. It will be described in detail with reference to FIG. 2.

Figure 2:
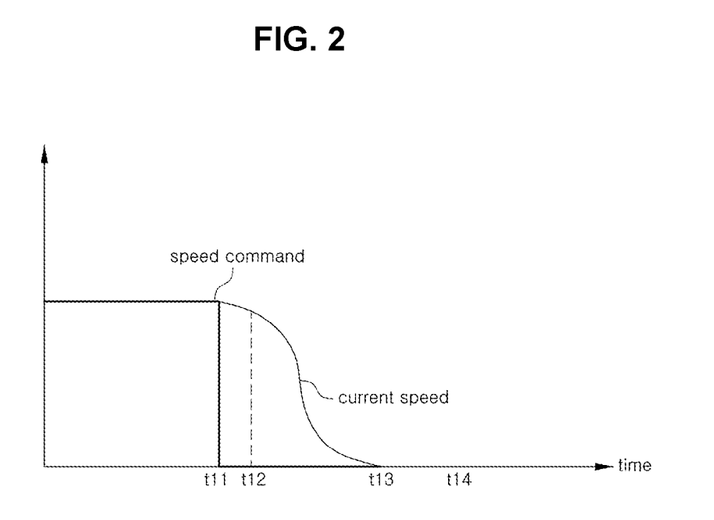
FIG. 2 is a diagram describing a process of a controller being restarted according to an embodiment of the present disclosure.

FIG. 2 is a diagram describing a process of a controller being restarted according to an embodiment of the present disclosure.

With reference to FIG. 2, the controller 100 may be reset due to an abnormal operation at time t11. Accordingly, the speed command of the motor 10 is '0' and the current speed of the motor 10 may be reduced.

At time t12, the controller 100 may be restarted to enter the driving control of the motor 10 after reset. At this time, it may be difficult for the controller 100 to recognize the current position of the motor 10 through a method of estimating the back EMF in the inertial braking section (time t12 to time t13) in which the motor 10 is decelerated by rotational inertia.

On the other hand, in order to control the operation of the controller 100 stably, the PWM control may be performed through the inverter 30 when the state of the motor 10 is in the stop state. However, it is difficult for the controller 100 to recognize the current position of the motor 10 in the inertial braking section (time t12 to time t13), there may be the overcurrent in the motor driving apparatus when PWM control is performed, assuming that the motor 10 is in a stop state in the inertial braking section (time t12 to time t13).

In order to prevent the overcurrent in the motor driving apparatus, a method of performing PWM control after a certain standby time (time t12 to time t14) has elapsed may be considered, but unnecessary standby time (time t13 to time t14) may cause delays in motor driving.

In other words, when the controller 100 determines that the state of the motor 10 is stopped at the time t13, the controller 100 may mitigate unnecessary motor driving delay by performing PWM control of driving the motor 10 through the inverter 30 according to the speed command for the motor 10.

Accordingly, when the controller 100 is restarted to enter the driving control of the motor 10 after a reset occurs in the controller 100, it is necessary for the controller 100 to determine whether the state of the motor 10 is in the stop state or inertial braking. It will be described in detail with reference to FIG. 3.

Figure 3:
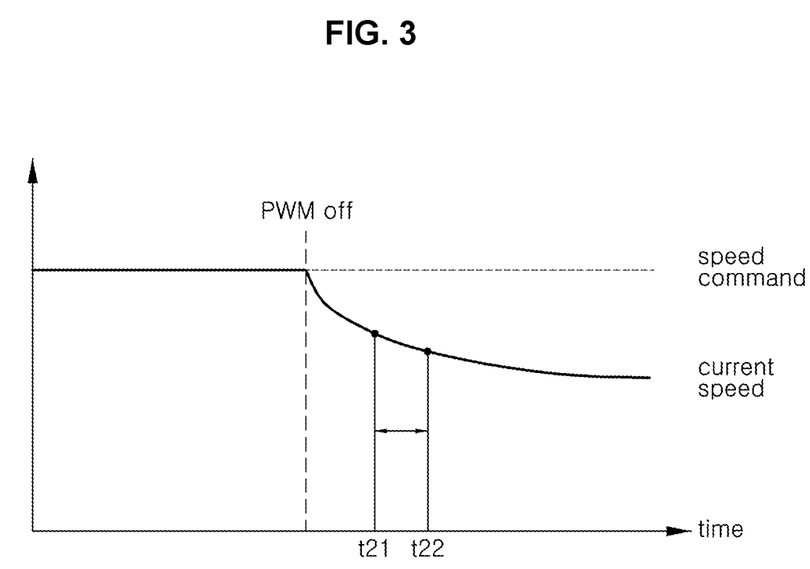
FIG. 3 is a diagram describing a process in which a controller according to an embodiment of the present disclosure estimates a current position and a current speed of a motor in an inertial braking state of the motor.

FIG. 3 is a diagram describing a process in which a controller according to an embodiment of the present disclosure estimates a current position and a current speed of a motor in an inertial braking state of the motor.

With reference to FIG. 3, after the controller 100 according to an embodiment of the present disclosure turns off the pulse width modulation (PWM) control by resetting, zero voltage vector pulse is applied to the switching signal input to the inverter 30 at least twice or more, and a process of estimating the current position and current speed of the motor 10 in the inertial braking state is shown.

The zero-voltage vector pulse may be defined as the independent pulse in the input torque of the motor 10. For example, when the zero-voltage vector pulse is applied to the switching signal, all switching elements of the inverter 30 connected to the positive electrode of the fuel cell stack 20 may be turned on, and all switching elements of the inverter 30 connected to the negative electrode of the fuel cell stack 20 may be turned off.

When the motor 10 is in the inertial braking state, the back EMF of the motor 10 is not generated, and thus, the controller 100 may determine the current position estimated value using a method of applying the zero-voltage vector pulse to the switching signal, which input to the inverter 30, instead of estimating the back EMF.

In more detail, at time 21, the controller 100 applies the zero-voltage vector pulse to the switching signal, which is input from the inverter 30, and may determine the current position estimated value of the motor 10 based on a result of current sensing of the motor 10 when applying the zero-voltage vector pulse.

At time t22 (the time point after the predetermined time interval td has elapsed from time t21), the controller 100, like at time t21, the controller 100 applies the zero-voltage vector pulse to the switching signal, and may determine the current position estimated value of the motor 10 based on the result of the current sensing of the motor 10 when applying the zero-voltage vector pulse.

Thereafter, the controller 100 may determine the current speed estimated value (west<N>) of the motor 10 using the determined current position estimated value (θest<N>) at time ti21, and the current position estimated value (θest<N−1>) at time t22, the predetermined time interval td between time t21 and t22, as shown in Equation 1. Here, the predetermined time interval td may be determined by the switching frequency of the inverter 30.

$$\omega est<N> = (\theta est<N> - \theta est<N-1>)/td \qquad \text{Equation 1:}$$

On the other hand, the controller 100 may determine the current position of the motor 10, which is in the inertial braking state, using a method of applying the zero-vector pulse to the switching signal, however, determining the current position of the motor 10, which is in the stop state, may not be possible. This will be described in detail with reference to FIG. 4.

Figure 4:
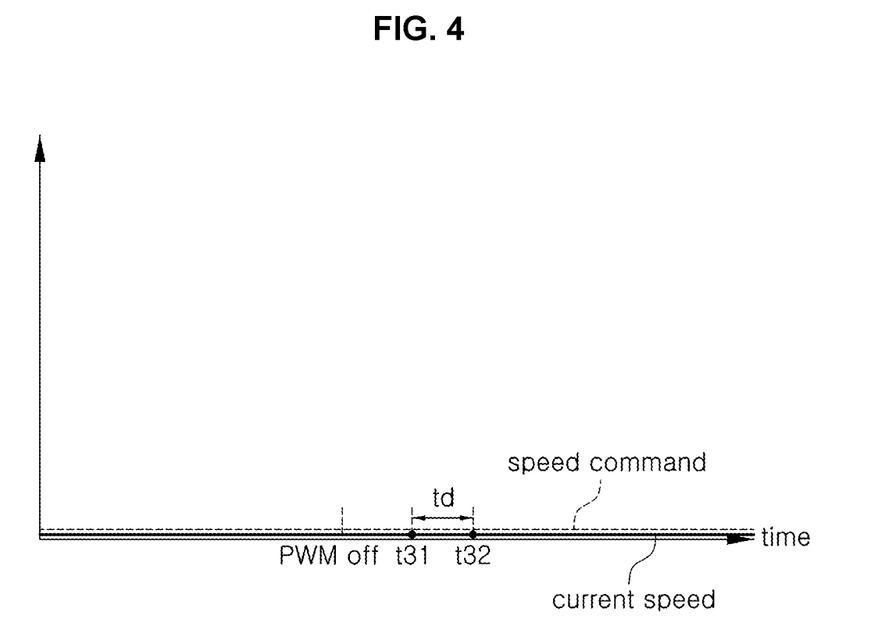
FIG. 4 is a diagram describing a process in which a controller according to an embodiment of the present disclosure estimates a current position and a current speed of a motor in a stop state of the motor.

FIG. 4 is a diagram describing a process in which a controller according to an embodiment of the present disclosure estimates a current position and a current speed of a motor in a stop state of the motor.

With reference to FIG. 4, after the controller 100 according to an embodiment of the present disclosure turns off the pulse width modulation control (PWM) by resetting, zero-voltage vector pulse is applied to the switching signal input to the inverter 30 at least twice or more, and a process of estimating the current position and current speed of the motor 10 in a stop state is shown.

Since the method of applying the zero-voltage vector pulse corresponds to the method of determining the current position of the motor under the condition that the motor 10 is in the inertial braking state, when the controller 100 sequentially applies the zero-voltage vector pulse to the motor 10 in the stop state (t31 and t32), it may not be possible to determine the current position of the motor 10. Accordingly, the current position estimated value and the current speed estimated value determined by the controller 100 may be diverged.

In other words, the current position estimated value or the amount of change in the current speed estimated value may fall within the normal range when the motor 10 is in the inertial braking state but may not fall within the normal range when the motor 10 is in the stop state.

Therefore, the present embodiment proposes that the controller 100 applies a zero-voltage vector pulse to the switching signal to determine whether the motor 10 is in a stopped state or an inertial braking state according to the amount of change in the current position estimation value and the current speed estimation value, and determine the execution time of the PWM control according to the determined result. The method for controlling the motor driving apparatus related thereto will be described in detail with reference to FIG. 5.

Figure 5:
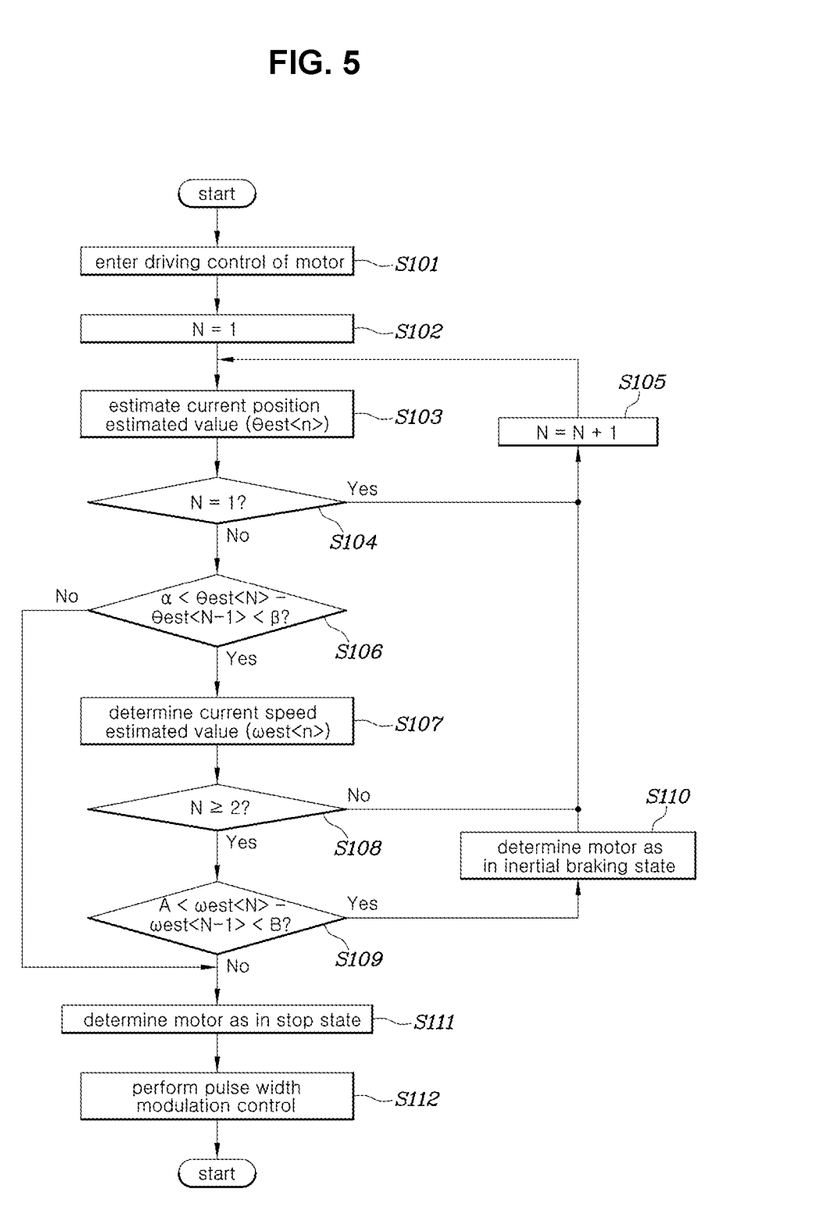
FIG. 5 is a flowchart describing a method for controlling a motor driving apparatus according to an embodiment of the present disclosure.

FIG. 5 is a flowchart describing a method for controlling a motor driving apparatus according to an embodiment of the present disclosure.

With reference to FIG. 5, when the controller 100 is restarted after a reset due to the abnormal operation, it may enter the driving control of the motor 10 at S101. Here, the initial value of 'N' may set to '1' at S102.

When entering the driving control of the motor 10, the controller 100 may determine the current position estimated value (θest<N>) of the motor 10 by applying the zero-voltage vector pulse to the switching signal, which is input from the inverter 30 driving the motor 10 at S103. More particularly, when entering the driving control of the motor 10, the controller 100 may apply the zero-voltage vector pulse to the switching signal at each predetermined time interval and determine the current position estimated value (θest<N>) of the motor 10 based on the result of sensing the current of the motor 10 when the zero-voltage vector pulse is applied.

Thereafter, the controller 100 may determine whether the value of 'N' is '1' or not at S104. When the value of 'N' is '1', '1' is added to the value of 'N' at S105, and step S103 may be performed again.

If the value of 'N' is not '1' (NO in S104), the controller 100 may determine whether the motor 10 is in the stop state according to the amount of change in the current position estimated value (see S106-S111). Here, the amount of change in the current position estimated value may be expressed as 'θest<N>−θest<N−1>'.

More particularly, since the amount of change of a rotor position of the motor 10 has to be constant in the inertial braking state, when the amount of change in the current position estimated value of the motor 10 does not fall within the predetermined position change amount range (NO in S106), the controller 100 may determine that the motor 10 is in the stop state at S111. Here, the lower limit value of the predetermined position change amount range may correspond to 'α', and the upper limit value of the predetermined normal range may correspond to 'β'. The lower limit value α may be calculated by considering the switching frequency of the inverter 30 and the current sensor processing speed of the motor 10, and the upper limit value β may be calculated by considering the speed limit according to the number of maximum rotation (angular velocity) of the motor 10.

In contrast, in the case where the amount of change in the current position estimated value falls within the predetermined position change amount range (YES in S106), the controller 100 may determine the current speed estimated value (ωest<N>) of the motor 10 at S107. For example, the controller 100 determines the current position estimated value based on the result of sensing current of the motor 10 at a first time point at which the zero-voltage vector pulse is applied to the switching signal, and may determine the current position estimated value based on the result of sensing current of the motor 10 at a second time point at which the zero-voltage vector pulse is applied to the switching signal. Thereafter, the controller 100 may determine the current speed estimated value (ωest<N>) based on the current position estimated value (θest<N−1>) of the first time point, the current position estimated value (θest<N>) of the second time point, and the predetermined time interval td between the first and second time point.

$$\omega est\langle N\rangle = (\theta est\langle N\rangle - \theta est\langle N-1\rangle)/td \qquad \text{Equation 1}$$

The controller 100 may determine whether the value of 'N' is greater than or equal to '2' at S108.

If the value of 'N' is greater than or equal to '2' (YES in S108), the controller 100 may redetermine whether the motor 10 is in the stop state according to the amount of change in the current speed estimated value of the motor 10 at S109. Here, the amount of change in the current speed estimated value may be expressed as '$\omega est<N>-\omega est<N-1>$'.

In more detail, when the amount of change in the current speed estimated value falls within the predetermined speed change amount (YES in S109), the controller 100 may determine that the motor 10 is in the inertial braking state at S110. Here, '1' is added to the value of 'N' at S105, and the controller 100 may determine the current position estimated value by applying the zero-voltage vector pulse to the switching signal until the motor 10 is in the stop state at S103. That is, the process of determining whether the motor 10 is in the stop state (S106 to S111) may be re-performed until the motor 10 is determined to be in the stop state.

The lower limit value of the predetermined speed change range may correspond to 'A', and the upper limit value of the predetermined normal range may correspond to 'B'. The lower limit value A may be calculated considering the current error of the motor 10 in the low-speed section of the motor 10, and the upper limit value B can be calculated considering the angular velocity of the motor 10 in the high-speed and medium-low sections of the motor 10.

On the other hand, if the current speed estimated value of the motor 10 does not fall within the predetermined speed change amount range (NO in S109), the controller 100 may be determined that the motor 10 is in the stop state at S111. When the controller 100 determines that the motor 10 is in the stop state, the pulse width modulation control may be performed by adjusting a duty ratio of the switching signal at S112.

Although not shown in FIG. 5, when the controller 100 determines that the current sensing is abnormal when the number of times that the amount of change in the current position estimated value is 'a' reaches a predetermined number in step S106, and after a predetermined standby time elapses at a time point when the driving control of the motor 10 is entered, the motor 10 may be determined to be in the stop state.

As described above, according to the present disclosure, when the controller of the motor driving apparatus is reset and then enters the driving control of the motor, the zero-voltage vector pulse is applied to the inverter to determine the amount of change in the current position estimated value of the motor, and by performing the pulse width modulation control to drive the motor according to the determined result, overcurrent of the motor and an unnecessary delay of the motor driving may be mitigated.

The present disclosure mentioned in the foregoing description may be implemented as code that can be written to a computer-readable recording medium and can thus be read by a computer system. The computer-readable medium may include all kinds of recording devices in which data readable by a computer system is stored. Examples of computer-readable medium includes hard disk drive (HDD), solid state disk (SSD), silicon disk drive (SDD), ROM, RAM, CD-ROM, magnetic tape, floppy disk, optical data storage device, and the like. Therefore, the above embodiments are therefore to be construed in all aspects as illustrative and not restrictive. The scope of the present disclosure should be determined by the appended claims and their legal equivalents, not by the above description, and all changes coming within the meaning and equivalent range of the appended claims are intended to be embraced therein.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. A motor driving apparatus comprising:
a motor;
an inverter configured to drive the motor based on a switching signal; and
a controller configured to determine a current position estimated value of the motor by applying a zero-voltage vector pulse to the switching signal when entering a driving control of the motor, to determine whether the motor is in a stop state according to an amount of change in the current position estimated value, and to perform a pulse width modulation control by adjusting a duty ratio of the switching signal when the motor is determined to be in the stop state;
wherein the controller is configured to determine the current position estimated value based on a result of the current sensing of the motor when the zero-voltage vector pulse is applied.

2. The apparatus of claim 1, wherein the controller is configured to apply the zero-voltage vector pulse to the switching signal in a predetermined time interval when entering the driving control of motor.

3. The apparatus of claim 1, wherein the controller is configured to determine that the motor is in the stop state when the amount of change in the current position estimated value does not fall within a predetermined position change amount range.

4. The apparatus of claim 1, wherein the controller is configured to redetermine whether the motor is in the stop state according to an amount of change in a current speed estimated value of the motor when the amount of change in the current position estimated value falls within the predetermined position change amount range.

5. The apparatus of claim 4, wherein the controller is configured to determine that the motor is in the stop state when the amount of change in the current speed estimated value does not fall within the predetermined speed change amount range.

6. The apparatus of claim 4, wherein the controller is configured to determine that the motor is in an inertial braking state when the amount of change in the current speed estimated value falls within the predetermined speed change amount range, and to determine the current position estimated value by applying the zero-voltage vector pulse to the switching signal until the motor is determined to be in the stop state.

7. The apparatus of claim 4, wherein the controller is further configured to determine:
the current position estimated value based on a result of a current sensing of the motor, at a first time point at which the zero-voltage vector pulse is applied to the switching signal;
the current position estimated value based on the result of the current sensing of the motor, at a second time point at which the zero-voltage vector pulse is applied to the switching signal; and
the current speed estimated value, based on the current position estimated value of the first time point, the current position estimated value of the second time point, and a predetermined time interval between the first time point and the second time point.

8. The apparatus of claim 1, wherein the controller is configured to determine that the motor is in the stop state when a predetermined standby time has elapsed since entering the driving control of the motor, and when a number of times that a change of the current position estimated value corresponding to '0' reaches a predetermined number of times.

9. A method for controlling a motor driving apparatus comprising:
   determining a current position estimated value of a motor by applying a zero-voltage vector pulse to a switching signal that is input to an inverter that drives the motor when entering a driving control of the motor;
   determining whether the motor is in a stop state according to an amount of change in the current position estimated value; and
   performing a pulse width modulation control by adjusting a duty ratio of the switching signal when determined as the stop state;
   wherein determining the current position estimated value comprises:
      determining the current position estimated value based on a result of a current sensing of the motor when applying the zero-voltage vector pulse.

10. The method of claim 9, wherein determining the current position estimated value further comprises:
   applying the zero-voltage vector pulse to the switching signal in a predetermined time interval when entering the driving control of the motor.

11. The method of claim 9, wherein determining whether the motor is in the stop state comprises determining that the motor is in the stop state when the amount of change in the current position estimated value does not fall within a predetermined position change amount range.

12. The method of claim 9, wherein determining whether the motor is in the stop state comprises redetermining whether the motor is in the stop state according to an amount of change in a current speed estimated value when the amount of change in the current position estimated value falls within the predetermined position change amount range.

13. The method of claim 12, wherein redetermining whether the motor is in the stop state comprises determining that the motor is in the stop state when the amount of change in the current speed estimated value does not fall within a predetermined speed change amount range.

14. The method of claim 12, wherein redetermining whether the motor is in the stop state comprises determining that the motor is in the stop state when the amount of change in the current speed estimated value falls within the predetermined speed change amount range; and determining whether the motor is in the stop state is repeated until the motor is determined to be in the stop state.

15. The method of claim 9, further comprising determining that the motor is in the stop state after a predetermined standby time has elapsed from a time at which driving control of the motor is entered, and when a number of times that an amount of change in the current position estimated value corresponding to '0' reaches a predetermined number of times.

* * * * *